United States Patent [19]

Hishida

[11] Patent Number: 5,662,963
[45] Date of Patent: Sep. 2, 1997

[54] METHOD FOR PREPARING COLORED THERMO PLASTIC RESIN PELLETS

[76] Inventor: Iwao Hishida, 4-16 Hattori, Minami-machi 4-chome, Toyonaka-shi, Osaka 561, Japan

[21] Appl. No.: 570,629

[22] Filed: Dec. 11, 1995

Related U.S. Application Data

[62] Division of Ser. No. 246,238, May 19, 1994, Pat. No. 5,536,576.

[30] Foreign Application Priority Data

May 21, 1993 [JP] Japan ................... 5-119756

[51] Int. Cl.$^6$ ................................................. B05D 7/00
[52] U.S. Cl. ...................... 427/212; 427/222; 427/430.1
[58] Field of Search ........................ 427/212, 222, 427/430.1

[56] References Cited

U.S. PATENT DOCUMENTS

| | | |
|---|---|---|
| Re. 28,361 | 3/1975 | Hahn . |
| 2,714,076 | 7/1955 | Seckel . |
| 3,035,003 | 5/1962 | Kessler . |
| 3,591,409 | 7/1971 | Aubrey et al. . |
| 3,632,369 | 1/1972 | Hahn . |
| 3,871,629 | 3/1975 | Hishida ................... 366/76.2 |
| 4,205,997 | 6/1980 | Hesse et al. . |
| 5,173,520 | 12/1992 | Carmody . |
| 5,316,885 | 5/1994 | Sasaki et al. . |
| 5,319,001 | 6/1994 | Morgan et al. . |

*Primary Examiner*—Shrive Beck
*Assistant Examiner*—David M. Maiorana
*Attorney, Agent, or Firm*—Armstrong, Westerman, Hattori, McLeland & Naughton

[57] ABSTRACT

Disclosed are colored, shaping thermoplastic resin pellets prepared by mixing shaping thermoplastic resin pellets of polyethylene, polypropylene, polystyrene, ABS resin, etc., a powdery colorant and a liquid thermoplastic adhesive of ethylene-vinyl acetate copolymer, nylon, water-soluble acrylic polymer, etc. having a water content of 5% by weight or more followed by drying the resulting mixture whereby said powdery adhesive is made adhered onto the surfaces of said pellets. The colored pellets are prepared, using minimized equipments and running costs necessary for melting and granulating steps. When mixing the powdery colorant and the uncolored shaping thermoplastic resin pellets, static electricity is not generated. The invention is free from troubles to be caused by antistatic agents and organic solvents, not needing them.

13 Claims, No Drawings

METHOD FOR PREPARING COLORED THERMO PLASTIC RESIN PELLETS

This is a division of application Ser. No. 08/246,238 filed May 19, 1994, now U.S. Pat. No. 5,536,576.

BACKGROUND OF THE INVENTION

1. Field of the Invention

The present invention relates to colored, shaping thermoplastic resin pellets to be used for obtaining colored shaped articles of thermoplastic resins, and to a method for preparing them.

2. Description of the Related Art

In general, as shaping methods for obtaining colored shaped articles of thermoplastic resins, there are known ① a method of feeding shaping thermoplastic resin pellets containing a powdery colorant into an injection-molding machine or an extrusion-molding machine, mixing them in the kneading step in the shaping machine and shaping the resulting mixture by injection molding or extrusion molding, ② a method of gradually adding a liquid colorant or a master batch colorant to shaping thermoplastic resin pellets in an injection-molding machine or an extrusion-molding machine so as to mix and knead them and shaping the resulting mixture by injection molding or extrusion molding, and ③ a method of previously preparing colored, shaping thermoplastic resin pellets as an intermediate product and introducing the colored, shaping thermoplastic resin pellets into a shaping machine to shape them.

A conventional method for preparing colored, shaping thermoplastic resin pellets as the intermediate product to be used in the above-mentioned method for obtaining colored, shaped articles of thermoplastic resins is such that uncolored resin pellets, a powdery colorant and a blend oil such as a liquid paraffin are mixed in a mixer, then the resulting mixture is fed to an extruder so as to knead it in a hot molten condition therein, the resulting melt is line-wise or sheet-wise extruded into a water tank so as to cool it therein, and this is granulated into granular or cubic, colored pellets by cutting.

Such colored, shaping thermoplastic resin pellets have various advantages in that they may easily be fed to a shaping machine where they are shaped into colored, shaped articles as final products, they may be stored or kept in stock and they may be distributed as they are. Therefore, they are intermediate products which are extremely easily handlable.

However, colored, shaping thermoplastic resin pellets to be prepared by the above-mentioned conventional method have various problems such as those mentioned below. Precisely, according to the above-mentioned conventional method, in order that the powdery colorant and the shaping thermoplastic resin are integrated, they have to be in a melting state and then be granulated. Therefore, in order to attain the storability to prevent the powdery colorant from dropping off from the thermoplastic resin, equipments for melting and granulating the shaping thermoplastic resin and the running costs for them are indispensable, resulting in increased production costs. In addition, when the shaping thermoplastic resin is melted, it is heated at 200° C. or higher so that its physical properties are deteriorated or it is often partly scorched to give scorched impurities to the resin melt. When the resin melt is extruded into a water tank, the resin is often hydrolyzed and deteriorated. When plural kinds of resin pellets having different colors are desired to be prepared, plural colorants with different colors are separately mixed with a thermoplastic resin one after another in the same mixer. Therefore, in order that the previous colorant remained in the mixer does not contaminate the next colorant with a different color, the inside of the mixer and the extruder to which the blend oil has adhered must be carefully cleaned at every change of the colorants, using solvents, detergents, waste or the like, but such cleaning operation is extremely troublesome.

In order to solve these problems inevitable in preparing colored, shaping thermoplastic resin pellets by the conventional methods, the present inventor expected that, if organic solvents and organic solvent-type adhesives are added to a powdery colorant and uncolored thermoplastic resin pellets in the step of mixing them in the above-mentioned conventional methods for preparing colored, shaping thermoplastic resin pellets, then the powdery colorant will adhere to the surfaces of the uncolored resin pellets. However, since a large amount of static electricity is generated in the mixer due to friction in the mixing step, the addition of organic solvents causes the danger of firing or explosion. Precisely, when thermoplastic resin pellets are mixed with colorants and additives in a mixer, a large amount of static electricity is generated instantaneously to give a discharging sound of sputtering or a flash so that the thus-charged mixer cannot be handled with hands. Therefore, in such a mixing step, addition of combustible organic solvents to the mixer causes the danger of firing or explosion so that organic solvents cannot be used for mixing thermoplastic resin pellets and powdery colorants. In this case, a means of adding antistatic agents to the mixer so as to prevent the generation of static electricity therein may be taken into consideration, but many antistatic agents are oily substances such as surfactants. Therefore, if such antistatic agents are added, the oily substances will adhere to the surfaces of the pellets to retard the adhesion of powdery colorants to the pellets. In place of this, another means of using incombustible chlorine-containing solvents may be employed with safety, by which, however, chlorine compounds will remain in the shaping thermoplastic resins prepared and these will cause other problems of corroding shaping molds or polluting the environment. Therefore, the latter is also unfavorable.

SUMMARY OF THE INVENTION

Given the situations, the present invention is to solve the above-mentioned problems of preparing colored, shaping thermoplastic resin pellets. Therefore, the object of the present invention is to prepare colored, shaping thermoplastic resin pellets while minimizing the equipments and the running costs needed in the melting step and the granulating step and, more specifically, to safely and efficiently prepare colored, shaping thermoplastic resin pellets while preventing the generation of static electricity during mixing powdery colorants and uncolored thermoplastic resin pellets and not using organic solvents, antistatic agents and chlorine-containing solvents so as not to cause various troubles in preparing the pellets.

Accordingly, colored, shaping thermoplastic resin pellets to be provided by the present invention are such that the surfaces of shaping thermoplastic resin pellets have a powdery colorant adhered thereto with a thermoplastic adhesive.

Such colored, shaping thermoplastic resin pellets are prepared by mixing uncolored, shaping thermoplastic resin pellets and a powdery colorant along with a liquid thermoplastic adhesive having a water content of 5% by weight or more, followed by drying the resulting mixture whereby the powdery colorant is made adhered to the surfaces of the pellets.

Alternatively, such colored, shaping thermoplastic resin pellets may also be prepared by adding water to uncolored, shaping thermoplastic resin pellets, mixing them, adding a powdery colorant and a liquid thermoplastic adhesive thereto and then drying the resulting mixture whereby the powdery colorant is made adhered to the surfaces of the pellets.

In both of the above-mentioned methods, the amount of water is controlled to be 0.05% by weight or more relative to the shaping thermoplastic resin pellets while mixing the components.

The colored, shaping thermoplastic resin pellets of the present invention are such that a necessary amount of a powdery colorant is adhered to the surfaces of the shaping thermoplastic resin pellets with a thermoplastic adhesive, and these may be prepared only in a mixer and are therefore advantageous in that the equipments and the running costs needed in the melting step and the granulating step in the preparing methods may be minimized. According to the methods of the present invention, a thermoplastic adhesive having a water content of 5% by weight or more is used or water is previously added to uncolored, shaping thermoplastic resin pellets, whereby the uncolored, shaping thermoplastic resin pellets may contain water of 0.05% by weight or more relative to the pellets during mixing them. Therefore, while uncolored, shaping thermoplastic resin pellets are mixed with a powdery colorant and an adhesive by the methods of the present invention, no static electricity is generated so that it is unnecessary to add any other additives such as an antistatic agent to the mixer. Hence, the present invention is advantageous in that any oily substance does not adhere to the surfaces of the pellets to retard the adhesion of the powdery colorant thereto. In addition, the colored pellets may be prepared according to the present invention, without needing a melting step. Therefore, the physical properties of the shaping resin are not deteriorated and the colored, shaping thermoplastic resin pellets are not contaminated with impurities of scorches of the resin. Moreover, the resin pellets are prepared without being brought into contact with a large amount of a cooling water according to the present invention, the resin is not deteriorated by hydrolysis. Further, the coloring operation comprises simple mixing and drying steps only, so that mass-production of a large amount of colored, shaping thermoplastic resin pellets is possible according to the present invention. Having these advantages, the present invention takes on a great significance in this technical field.

DETAILED DESCRIPTION OF THE INVENTION

Next, the details of the present invention will be mentioned hereunder.

The shaping thermoplastic resin to be used in the present invention is one that is generally widely used as a shaping material in this technical field. Precisely, any of thermoplastic resins to which ordinary shaping methods such as injection shaping, extrusion shaping and the like are applicable, and shaping materials to be obtained by adding various additives to such thermoplastic resins may be employable in the present invention, without being specifically defined. Specific examples of usable thermoplastic resins include polyethylenes, polypropylenes, polystyrenes, ABS resins, polymethyl methacrylates, polyamides, polycarbonates, polybutylene terephthalates, polyvinyl chloride resins, ethylene-vinyl acetate copolymer (EVA) resins, etc. The shape of the pellets of such thermoplastic resins which are used as the starting material in the present invention may be any of granular and polyhedral ones. The size of the pellets is not specifically defined, provided that the pellets may be fed to shaping machines. The pellets of such kinds may be prepared by ordinary methods where a thermoplastic resin to be shaped is line-wise or sheet-wise extruded through a multi-hole nozzle of an extruder, cooled and then cut into columnar or cubic pellets each having a size of approximately from 2 to 3 mm as its diameter or side.

Next, the thermoplastic adhesive to be used in the present invention is chosen from among those soluble in water or lower alcohols such as isopropyl alcohol or emulsifiable in these solvents, and it is used in the form of its aqueous solution or emulsion containing water. Specific examples of thermoplastic adhesives to be used in the form of their emulsions include polyvinyl acetates, ethylene-vinyl acetate copolymers, etc. Water-soluble thermoplastic adhesives usable in the present invention include water-soluble polyamides (nylons), water-soluble acrylic polymers, polyvinyl butyrals, etc. Usable thermoplastic adhesives which are soluble in a mixture of water and isopropyl alcohol include acrylic polymers, etc.; and usable thermoplastic adhesives which are soluble in alcohols include polyamides, etc.

The water content in these thermoplastic adhesives is 5% by weight or more. The adhesive is added to shaping thermoplastic resin pellets in an amount of from 0.5 to 1.5% by weight relative to the pellets, while the content of water in the shaping thermoplastic resin pellets is made 0.05% by weight or more by adjusting the amount of the adhesive to be added to the pellets. This is because if the water content in the adhesive is too small or is less than 5% by weight, the amount of water to be in the shaping thermoplastic resin pellets will be insufficient so that the pellets will generate static electricity due to friction to unfavorably cause firing or electric charging of operators. The uppermost limit of the water content in the adhesives is not specifically defined but has been found to be generally 90% by weight or less to obtain favorable results.

According to the method of the present invention for preparing the colored, shaping thermoplastic resin pellets, uncolored, shaping thermoplastic resin pellets are mixed with a powdery colorant and thereafter a liquid thermoplastic adhesive is added thereto. Alternatively, a powdery colorant is first mixed with a liquid thermoplastic adhesive to give an ink-like mixture and this may be mixed with uncolored, shaping thermoplastic resin pellets to obtain colored pellets having the same quality.

Where a large amount of a powdery colorant is used or where a powdery colorant having a small specific gravity such as carbon black is used, it is desired that uncolored resin pellets are first mixed with a thermoplastic adhesive for about 2 minutes and thereafter an adhesive of the same kind is again added thereto in an amount of from 0.5 to 1%, whereby the degree of adhesion of the powdery colorant to the pellets may be increased.

Also in the case where uncolored, shaping thermoplastic resin pellets are previously mixed with water and thereafter a powdery colorant and a liquid thermoplastic adhesive are added thereto, the water content in the resin pellets is controlled to be 0.05% by weight or more in the same manner as above, whereby generation of static electricity due to friction of the pellets may be prevented and firing and electric charging of operators may be prevented. The liquid thermoplastic adhesive to be used in this case is one soluble in organic solvents. For example, usable are thermoplastic adhesives prepared by dissolving thermoplastic resins such as ethylene-vinyl acetate copolymer (EVA) resins, polyvinyl chloride resins, polyvinyl acetate resins, polyethylenes, ABS resins, AS resins, methacrylic resins, etc. in organic solvents such as toluene, alcohols, methyl ethyl ketone (MEK), etc.

Since the above-mentioned colored, shaping thermoplastic resin pellets of the present invention are such that the surfaces of the shaping thermoplastic resin pellets have a necessary amount of a powdery colorant adhered thereto with a thermoplastic adhesive, the powdery colorant does not drop off from the surfaces of the pellets to scatter in the air. Therefore, the colored pellets may be stored or distributed as they are. In addition, since the adhesive used is thermoplastic, the colored pellets may directly be fed into a shaping machine to be shaped therein.

According to the methods of the present invention for preparing the colored, shaping thermoplastic resin pellets, when uncolored, shaping thermoplastic resin pellets, a powdery colorant and a liquid thermoplastic adhesive are mixed, water contained in the thermoplastic adhesive or water previously added to the uncolored, shaping thermoplastic resin pellets prior to the mixing may act as lubricant to prevent accumulation of static electricity in the mixture. Therefore, the methods are completely free from the generation of static electricity. In addition, they are also free from the formation of impurities such as corrosive compounds and scorches of resins.

EXAMPLES 1 TO 7

According to the formulation shown in Tables 1 to 7 below, 25 kg of uncolored, shaping thermoplastic resin pellets ① were put in a 100-liter super-mixer (made by Kawada Seisaku-sho KK), a determined amount of a powdery colorant ② was added thereto while rotating the mixer at 200 rpm. One minute after the addition, from 0.5 to 1.5% by weight, relative to the above-mentioned pellets, of a thermoplastic adhesive composition ③ was added thereto and mixed for further 2 minutes, and then the rotation speed was lowered to 60 rpm. The resulting mixture was transferred onto a belt conveyer equipped with a hot-air drier and dried thereon. The thus-obtained colored pellets were transferred into a storage tank under pressure.

TABLE 1

| Formulation of Example 1 | | |
|---|---|---|
| ① Polystyrene (Estyrene G-15; made by Shin-Nittetsu Chemical Co.) | 25 Kg | |
| ② Dry color Blue (oily dye; made by Towa Chemical Co.) | 10 g | |
| ③ Thermoplastic Adhesive Composition (NV 25%) | 50 g | |
| (i) Acrylic Resin Adhesive (Arolon 477, NV 50%; made by Nippon Shokubai KK) | | 50 wt. % |
| (ii) Isopropyl Alcohol (IPA) | | 32 wt. % |
| (iii) Water | | 18 wt. % |

TABLE 2

| Formulation of Example 2 | | |
|---|---|---|
| ① Polypropylene (Noblen W-531; made by Sumitomo Chemical Co.) | 25 kg | |
| ② Dry Color Brown (made by Towa Chemical Co.) | 100 g | |
| ③ Thermoplastic Adhesive Composition (NV 40%) | 50 g | |
| (i) Solid Polyamide Resin Adhesive (Tohmide TXB; made by Fujikasei Kogyo Co.) | | 40 wt. % |
| (ii) Isopropyl Alcohol (IPA) | | 30 wt. % |
| (iii) Water | | 27 wt. % |
| (iv) Aqueous Ammonia | | 3 wt. % |

Thermoplastic adhesive composition was heated at 50° C. for 3 hours, then melted and stirred.

TABLE 3

| Formulation of Example 3 | | |
|---|---|---|
| ① Ethylene-Vinyl acetate Copolymer (EVA) Resin (Suntec EVA; made by Asahi Chemical Co.) | 25 kg | |
| ② Dry Color Gray (made by Towa Chemical Co.) | 150 g | |
| ③ Thermoplastic Adhesive Composition (NV 34.5%) | 200 g | |
| (i) EVA Adhesive (polysol P-62; made by Showa Polymer co.) | | 58.5 wt. % |
| (ii) Butylene Glycol | | 4.1 wt. % |
| (iii) Water | | 37.4 wt. % |

To prepare thermoplastic adhesive composition, the mixture of (ii) and (iii) was gradually added to (i) while stirring, and this was mixed with ② in a mixer to give an ink-like mixture. The mixture was mixed with ① and dried whereby the colorant was adhered to the resin pellets.

TABLE 4

| Formulation of Example 4 | | |
|---|---|---|
| ① ABS Resin (Cevian V-450; made by Daicel Chemical Co.) | 25 kg | |
| ② Dry Color White (made by Towa Chemical Co.) | 250 g | |
| ③ Thermoplastic Adhesive Composition (NV 25%) | 600 g | |
| (i) Water-soluble Acrylic Resin Adhesive (Arolon 477, NV 50%; made by Nippon Shokubai KK) | | 50 wt. % |
| (ii) Isopropyl Alcohol (IPA) | | 22 wt. % |
| (iii) Butyl Cellosolve | | 10 wt. % |
| (iv) Water | | 18 wt. % |

TABLE 5

| Formulation of Example 5 | | |
|---|---|---|
| ① Nylon 66 (Amilan NY-66; made by Toray Co.) | 25 kg | |
| ② Dry Color Cream (made by Towa Chemical Co.) | 250 g | |
| ③ Thermoplastic Adhesive Composition (NV 17%) | 300 g | |
| (i) Water-soluble Polyamide Adhesive (Fine Resin FR301; made by En-ichi Co.) | | 17 wt. % |
| (ii) Isopropyl Alcohol (IPA) | | 58 wt. % |
| (iii) Water | | 25 wt. % |

TABLE 6

| Formulation of Example 6 | | |
|---|---|---|
| ① Polystyrene Resin (Estyrene G-15; made by Shin-Nittetsu Chemical Co.) | 25 kg | |
| ② Dry Color White (made by Towa Chemical Co.) | 250 g | |
| ③ Thermoplastic Adhesive Composition (NV 25%) | 600 g | |
| (i) Water-soluble Acrylic Resin Adhesive (Arolon 477, NV 50%; made by Nippon Shokubai KK) | | 50 wt. % |
| (ii) Isopropyl Alcohol (IPA) | | 22 wt. % |
| (iii Butyl Cellosolve | | 10 wt. % |
| (iv) Water | | 18 wt. % |
| ④ Foaming Agent (OBSH; made by Eiwa Chemical Co.) | 50 g | |

TABLE 7

| Formulation of Example 7 | | |
|---|---|---|
| ① Polypropylene (glass fibers-containing FR-PPV7200; made by Mitsui Petro-Chemical Co.) | 25 kg | |
| ② Dry Color Black (made by Towa Chemical Co.) | 250 g | |
| ③ Thermoplastic Adhesive Composition (NV 40%) | 50 g | |
| (i) Solid Polyamide Resin Adhesive (Tohmide TXB; made by Fujikasei Kogyo Co.) | | 40 wt. % |

TABLE 7-continued

| Formulation of Example 7 | |
| --- | --- |
| (ii) Isopropyl Alcohol (IPA) | 30 wt. % |
| (iii) Water | 27 wt. % |
| (iv) Aqueous Ammonia | 3 wt. % |

In order to determine the adhesiveness of the powdery colorant to the shaping thermoplastic resin pellets in the colored, shaping thermoplastic resin pellets obtained in these Examples 1 to 7, a white paper was stuck to the inner wall of the storage tank to check as to whether or not the white paper was stained with the colored, shaping thermoplastic resin pellets when the pellets were kept in contact with the paper. In order to determine the degree of dispersion of the colorant in the shaped articles made out of the colored, shaping thermoplastic resin pellets, the pellets were shaped into test pieces by injection molding and their surfaces were observed with the naked eye.

As a result, none of the colored, shaping thermoplastic resin pellets of the present invention obtained in Examples 1 to 7 stained the white paper stuck to the inner wall of the storage tank when kept in contact therewith. From this, it was verified that the powdery colorant was firmly adhered to the surfaces of the thermoplastic resin pellets in all the colored pellets obtained in these examples. In addition, it was also verified that the degree of dispersion of the colorant appeared on the surfaces of all the shaped articles made out of these colored, shaping thermoplastic resin pellets was extremely good.

EXAMPLES 8 AND 9

25 kg of uncolored, shaping thermoplastic resin pellets ① were put in a 100-liter super-mixer (made by Kawada Seisaku-sho KK), a determined amount of water ② was added thereto while stirring, then a determined amount of a powdery colorant ③ was added thereto, and successively a thermoplastic adhesive composition ④ was added thereto and stirred to prepare a uniform mixture, according to the formulation shown in Tables 8 and 9 below. The mixture was taken out from the super-mixer and dried in a drier at 80° C. for 5 minutes whereby the organic solvent and water were vaporized.

TABLE 8

| Formulation of Example 8 | |
| --- | --- |
| ① Polypropylene (Mitsui Noblen J3H-G; made by Mitsui Toatsu Chemical Co.) | 25 kg |
| ② Water | 25 g |
| ③ Dry Color Gray (made by Towa Chemical Co.) | 150 g |
| ④ Thermoplastic Adhesive Composition (NV 20%) | 50 g |
| (i) Acrylic Resin Adhesive (Acrydic 56-834, NV 40%; made by Dai-Nippon Ink Co.) | 50 wt. % |
| (ii) Toluene | 50 wt. % |

TABLE 9

| Formulation of Example 9 | |
| --- | --- |
| ① ABS Resin (Kralastic MHB; made by Sumitomo Dow Co.) | 25 kg |
| ② Water | 12.5 g |
| ③ Dry color Brown (made by Towa Chemical Co.) | 125 g |
| ④ Thermoplastic Adhesive Composition (NV 10%) | 50 g |

TABLE 9-continued

| Formulation of Example 9 | |
| --- | --- |
| (i) Solid Acrylic Resin Adhesive (BR-102; made by Mitsubishi Rayon Co.) | 10 wt. % |
| (ii) Toluene | 81 wt. % |
| (iii) Methanol | 9 wt. % |

Colored, shaping thermoplastic resin pellets of the present invention obtained in Examples 8 and 9 above were separately shaped by injection molding to give good shaped articles, without dispersion failure, colorant-coating failure and flashing during injection molding.

Tests of these shaped articles revealed that the effective amount of water to be in the resin mixture was within the range of from 0.05 to 0.15% by weight, preferably about 0.1% by weight or so, relative to the shaping thermoplastic resin, though depending on the kind of the resin.

I claim:

1. A method for preparing colored thermoplastic resin pellets, characterized in that uncolored thermoplastic resin pellets, a powdery colorant and a liquid thermoplastic adhesive having a water content of 5% by weight or more are mixed in such a way that the amount of water is 0.05% by weight or more relative to the pellets, and thereafter the resulting mixture is dried whereby the powdery colorant is made adhered to the surfaces of the pellets.

2. A method for preparing colored thermoplastic resin pellets as claimed in claim 1, in which uncolored thermoplastic resin pellets are mixed with a powdery colorant, and the resulting mixture is mixed with a liquid thermoplastic adhesive and then dried.

3. A method for preparing colored thermoplastic resin pellets as claimed in claim 1, in which a powdery colorant and a liquid thermoplastic adhesive are mixed together, and uncolored thermoplastic resin pellets are mixed with the resulting mixture and then dried.

4. A method for preparing colored, thermoplastic resin pellets as claimed in claim 1, in which the surfaces of the pellets have a powdery colorant adhered thereto with from 0.5 to 1.5% by weight, relative to the pellets, of a thermoplastic adhesive.

5. A method for preparing thermoplastic resin pellets as claimed in claim 1, wherein the thermoplastic resin pellets are made from a resin selected from the group consisting of polyethylene, polypropylene, polystyrene, acrylonitrile-butadiene-styrene, polymethyl methacrylate, polyamide, polycarbonate, polyester, polyvinyl chloride and ethylene-vinyl acetate copolymer resins.

6. A method for preparing colored, thermoplastic resin pellets as claimed in claim 1, in which the liquid thermoplastic adhesive is an aqueous solution of a water-soluble thermoplastic resin, an alcoholic solution of a thermoplastic resin soluble in a lower alcohol such as isopropyl alcohol, or an emulsion prepared by emulsifying a thermoplastic resin in water or a lower alcohol.

7. A method for preparing colored thermoplastic resin pellets as claimed in claim 6, in which the liquid thermoplastic adhesive is en emulsion of a polyvinyl acetate or an emulsion of an ethylene-vinyl acetate copolymer.

8. A method for preparing colored thermoplastic resin pellets as claimed in claim 6, in which the liquid thermoplastic adhesive is an aqueous solution of a water-soluble polyamide, an aqueous solution of a water-soluble acrylic polymer or an aqueous solution of a polyvinyl butyral.

9. A method for preparing colored thermoplastic resin pellets as claimed in claim 6, in which the liquid thermoplastic adhesive is a solution prepared by dissolving an acrylic polymer in a mixture of water and isopropyl alcohol.

10. A method for preparing colored thermoplastic resin pellets as claimed in claim 6, in which the liquid thermoplastic adhesive is an alcoholic solution of a polyamide.

11. A method for preparing colored thermoplastic resin pellets, characterized in that uncolored thermoplastic resin pellets are mixed with 0.05% by weight or more, relative to the pellets, of water, and the resulting mixture is further mixed with a powdery colorant and a liquid thermoplastic adhesive and then dried whereby the powdery colorant is made adhered to the surfaces of the pellets.

12. A method for preparing colored thermoplastic resin pellets as claimed in claim 11, wherein the thermoplastic resin pellets are made of a resin selected from the group consisting of polyethylene, polypropylene, polystyrene, acrylonitrile-butadiene-styrene, polymethyl methacrylate, polyamide, polycarbonate, polyester, polyvinyl chloride and ethylene-vinyl acetate copolymer resins.

13. A method for preparing colored thermoplastic resin pellets as claimed in claim 11, wherein the liquid thermoplastic adhesive is prepared by dissolving a thermoplastic resin selected from the group consisting of ethylene-vinyl acetate copolymer resins, polyvinyl chloride resins, polyvinyl acetate resins, polystyrene resins, acrylonitrile-butadiene-styrene resins, acrylonitrile-styrene resins and methacrylic resins, in an organic solvent selected from the group consisting of toluene, alcohols and methyl ethyl ketone.

* * * * *

UNITED STATES PATENT AND TRADEMARK OFFICE
CERTIFICATE OF CORRECTION

PATENT NO. : 5,662,963
DATED : September 2, 1997
INVENTOR(S) : Iwao Hishida

It is certified that error appears in the above-identified patent and that said Letters Patent is hereby corrected as shown below:

On the title page, item [54] and col. 1, "...COLORED THERMO PLASTIC RESIN..." should be --...COLORED THERMOPLASTIC RESIN...--.

Signed and Sealed this

Thirtieth Day of June, 1998

Attest:

BRUCE LEHMAN

Attesting Officer     Commissioner of Patents and Trademarks